(12) United States Patent
Neuhaus-Steinmetz et al.

(10) Patent No.: US 7,090,898 B2
(45) Date of Patent: *Aug. 15, 2006

(54) COATING PROCESS FOR PRODUCING PRODUCTS IN WEB FORM HAVING AT LEAST TWO LAYERS BY APPLICATION OF ELECTROSTATIC CHARGES FOLLOWED BY NEUTRALIZATION OF SAME

(75) Inventors: Hermann Neuhaus-Steinmetz, Ahrensburg (DE); Maren Klose, Seevetal (DE); Lars Guldbrandsen, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 126 days.

This patent is subject to a terminal disclaimer.

(21) Appl. No.: 10/213,184

(22) Filed: Aug. 6, 2002

(65) Prior Publication Data

US 2003/0075268 A1    Apr. 24, 2003

(30) Foreign Application Priority Data

Oct. 22, 2001   (DE) ............................... 101 51 286

(51) Int. Cl.
*B05D 1/04*    (2006.01)
*B05D 1/26*    (2006.01)

(52) U.S. Cl. ................. 427/482; 427/483; 427/485; 427/207.1; 427/420

(58) Field of Classification Search ............... 427/458, 427/482, 483, 485, 207.1, 208.2, 208.4, 420, 427/472, 457, 356, 358
See application file for complete search history.

(56) References Cited

U.S. PATENT DOCUMENTS

| | | | |
|---|---|---|---|
| 3,196,063 A | 7/1965 | Paquin et al. | |
| 3,498,865 A | 3/1970 | Paquin et al. | |
| 4,101,687 A * | 7/1978 | Knudsen | 427/460 |
| 4,339,485 A * | 7/1982 | Shibano et al. | 428/40 |
| 4,457,256 A * | 7/1984 | Kisler et al. | 118/621 |
| 4,513,683 A * | 4/1985 | Kisler | 118/620 |
| 4,517,143 A * | 5/1985 | Kisler | 264/484 |
| 4,622,260 A | 11/1986 | Tesch | 428/173 |
| 4,791,004 A * | 12/1988 | Suzuki et al. | 427/541 |
| 5,173,141 A * | 12/1992 | Leseman et al. | 156/244.15 |
| 5,340,616 A * | 8/1994 | Amano et al. | 427/458 |
| 5,975,873 A | 11/1999 | Zimmerman et al. | 425/174.8 |
| 6,120,278 A | 9/2000 | Zimmermann et al. | 425/174.8 E |
| 6,127,003 A * | 10/2000 | Fukuda et al. | 427/535 |
| 6,242,051 B1 * | 6/2001 | Zaretsky | 427/472 |
| 6,896,936 B1 * | 5/2005 | Neuhaus-Steinmetz et al. | 427/482 |

FOREIGN PATENT DOCUMENTS

| | | |
|---|---|---|
| DE | 1 704 734 | 6/1971 |
| DE | 31 38 671 A1 | 6/1982 |

(Continued)

OTHER PUBLICATIONS

Encyclopedia of Polymer Science and Engineering, vol. 3, pp. 563-565, 1985.*

(Continued)

*Primary Examiner*—Fred J. Parker
(74) *Attorney, Agent, or Firm*—Norris McLaughlin & Marcus PA (57) ABSTRACT

A process for producing products in web form comprising at least two layers, in which a composition emerging from an applicator is applied as a layer to a substrate in web form which is guided on a transport means, said application taking place with application of electrostatic charges, and the substrate coated with the composition is electrostatically neutralized before departing the applicator.

20 Claims, 5 Drawing Sheets

FOREIGN PATENT DOCUMENTS

| | | |
|---|---|---|
| DE | 33 19 448 A1 | 11/1984 |
| DE | 38 74 991 T2 | 2/1993 |
| DE | 43 13 008 C1 | 11/1994 |
| DE | 195 34 702 A1 | 3/1997 |
| DE | 195 34 704 A1 | 3/1997 |
| DE | 199 05 935 A1 | 8/2000 |
| EP | 0 071 212 B1 | 4/1986 |
| EP | 0 299 492 A2 | 1/1989 |
| EP | 0 546 988 A1 | 6/1993 |
| EP | 0 578 151 A1 | 1/1994 |
| EP | 0 707 940 A2 | 4/1996 |
| EP | 0 764 521 A2 | 3/1997 |
| EP | 0 850 747 A1 | 7/1998 |
| EP | 0 920 933 A2 | 6/1999 |

OTHER PUBLICATIONS

Abstract of EP 0764521 from EPO website database, no date avail.

U.S. Appl. No. 10/291,944, no date avail.

* cited by examiner

COATING PROCESS FOR PRODUCING PRODUCTS IN WEB FORM HAVING AT LEAST TWO LAYERS BY APPLICATION OF ELECTROSTATIC CHARGES FOLLOWED BY NEUTRALIZATION OF SAME

The invention relates to a process for producing products in web form comprising at least two layers, especially adhesive tapes with a carrier material atop which an adhesive has been applied.

Work has long been ongoing on producing adhesive tapes without using solvents or at least on designing the coating operation and the downstream steps to be solvent-free. Corresponding products with films of adhesive based on synthetic rubbers are known. These products, however, cover only the lower-end performance range of adhesive tapes.

For a number of years it has also been possible to obtain solvent-free adhesives based on acrylate, which can be processed further as hotmelt adhesives for adhesive tapes. Normally, however, they do not match the shear strengths of acrylate compositions applied from solution. One important reason for this is that the viscosity of the compositions during processing must not become too high, since otherwise the operations of melting and of coating onto a carrier are too expensive from the economic standpoint. The viscosity is determined substantially by the length of the molecules. Relatively short chain molecules, however, result in poorer shear strengths. Even crosslinking of the adhesive following its application permits only limited improvement.

In the case of natural rubber adhesive systems, the melting operation can be avoided if success is achieved in mixing the components of the composition without solvent and if the hot composition is supplied directly to a coating system. Examples of suitable mixing units include extruders. In the course of mixing, however, the rubber must not be degraded any more than slightly, since otherwise the product properties are impaired.

In the case of acrylate systems, the melting operation can be avoided by removing the solvent or water from compositions polymerized in solvents or in water, the removal taking place inline for the purpose of coating. In an appropriate extruder, for example, solvents or water can be removed by way of vacuum zones.

For the application of high-viscosity compositions, slot dies are suitable. It is found that they are also suitable for high-viscosity adhering compositions as described above. However, above a relatively low web speed, air bubbles become included between the adhesive and the substrate, which is typically coated on a lay-on roller.

In order to reduce the formation of bubbles in the above task, the market recommends blowing dies, suction dies, and what are known as vacuum boxes. The aim of using these devices is to raise the force with which the composition is pressed against the substrate.

Known from film manufacture (for example, EP 0 920 973 A2) are wire, blade, and needle electrodes, disposed transverse to the web, with which electrical charges are applied to the composition that is to be laid on. By this means the composition is pressed by electrostatic forces against a metal roller.

For the above-described coating of substrates, the literature reports complex solutions, in which before being laid onto the chill roll the substrate is charged in multistage upstream processes, partially discharged by heating, and cooled, in order finally to obtain uniform charging of the substrate on the lay-on roller (for example, EP 0 299 492 A2).

The maximum level of charge on the substrate in these cases, however, is relatively low, since as early as on leaving the charging roller it is reduced until the air is no longer ionized, owing to the electrical field strength resulting from the charge density.

DE 199 05 935 A1 discloses a method of producing a coating of solvent-free pressure sensitive adhesive systems on substrates, especially release-coated substrates, in which
the pressure sensitive adhesive system is applied in one or more layers to a rotating roller by means of an adhesive applicator,
the pressure sensitive adhesive system on the roller is crosslinked in an exposure means by high-energy radiation, specifically by means of electron beams (EB), UV or IR radiation, and
the roller is contacted with the substrate, so that the pressure sensitive adhesive system is transferred from the roller to the substrate, and where appropriate is rolled up.

Typical exposure means employed in the context of the embodiment of the method that is depicted in said patent include linear cathode systems, scanner systems, and multiple longitudinal cathode systems, where electron beam accelerators are concerned.

The acceleration voltages are situated in the range between 40 kV and 350 kV, preferably from 80 kV to 300 kV. The output doses range between 5 and 150 kGy, in particular from 20 to 90 kGy.

As UV crosslinking units it is possible in particular to employ two medium pressure mercury lamps each with an output of 120 W/cm or one medium pressure mercury lamp having an output of 240 W/cm. The doses set are preferably from 10 to 300 mJ/cm$^2$.

DE 199 05 935 A1 describes a method of producing a coating of solvent-free pressure sensitive adhesive systems on substrates, especially release-coated substrates, in which
a fluid film is applied to a rotating roller by means of a fluid applicator,
the pressure sensitive adhesive system is applied in one or more layers to the fluid film by means of an adhesive applicator, so that the fluid film is located between roller and pressure sensitive adhesive system, and
the roller is contacted with the substrate, so that the pressure sensitive adhesive system is transferred from the roller to the substrate (release-coated or otherwise).

The contacting of the substrate takes place in particular by way of a second roller. Substrates used include papers, films, nonwovens, and release-coated materials such as release papers, films, and the like.

The second roller, also referred to as a contact roller, may have been provided with a rubber coating and is pressed against the roller with a linear pressure of preferably 50 to 500 N/mm, in particular from 100 to 200 N/mm. The contact roller preferably has a Shore hardness (A) of from 40 to 100, in particular a Shore hardness of from 60 to 80 shore (A). The substrate is preferably brought into contact with the roller in such a way that the speed of the roller surface coincides with that of the substrate. Where, however, it is intended that a reduction in thickness should take place along with the removal of the adhesive film, the substrate may also have a higher speed.

In one advantageous embodiment the roller is a steel roller, a chrome-plated steel roller, a rubber roller or a silicone rubber roller and/or is manufactured from elastic material. Furthermore, the roller may be smooth or may have a slightly structured surface.

The smooth roller may preferably have a chrome coating. Optionally, the chrome-coated steel roller may possess a high-gloss-polished surface with a roughness $R_z<0.02$ μm. The coating roller may also, however, be rubberized, preferably with a rubber hardness of from 40 to 100 shore (A), in particular with a hardness of from 60 to 80 shore (A). The roller coating may, in accordance with the prior art, comprise EPDM, Viton or silicone rubber, or other elastic materials.

It has also proven advantageous for the roller to be temperature-controllable, preferably in a range from −10° C. to 200° C., with very particular preference from 2° C. to 50° C.

It is an object of the invention to allow the substrate to be coated with compositions, especially compositions of high viscosity, such as are used for producing adhesive tapes or similar products, with the preferred use of a slot die, with sufficiently high web speeds. In the course of this operation, there should be no bubbles included between the composition coat and the substrate, no detriment to quality-critical properties of the product being produced, and no hazards arising for operating staff.

This object is achieved by means of a process as specified in the main claim. The subclaims describe advantageous embodiments of the process.

The invention accordingly provides a process for producing products in web form having at least two layers, in which a composition emerging from an application means is applied to a substrate in web form which is guided on a transport means, said application taking place with application of electrostatic charges, and in which the substrate coated with the composition is electrostatically neutralized before departing the application means.

In a first preferred embodiment of the process the application means is configured as a die, particularly a slot die.

The transport means is coated, preferably contactlessly, with the composition emerging from the die. The distance of the die from the transport means may be preferably from 0.01 to 60 mm, in particular from 1 to 30 mm.

With further preference, the transport means is designed as a lay-on roller, which additionally, in particular, is of a grounded and/or temperature-controllable design.

In order to be able to provide the composition with the charge according to the invention, the composition may be charged electrostatically by means of at least one charging electrode which is located in particular above the transport means, preferably lay-on roller, and specifically in the region of the lay-on line of the composition coat. The coat is pressed onto the substrate with the aid of the charges.

With the lay-on electrode, charges—electrons, for example—are applied to one side of the composition. On the surface of the transport means, preferably lay-on roller, countercharges come about immediately. The resulting field causes a force to act on the composition plus substrate, which presses both coats onto the transport means, preferably lay-on roller.

Moreover, in one outstanding embodiment of the inventive concept, the substrate coated with the composition is electrostatically neutralized by means of at least one countercharging electrode prior to departing the transport means, preferably lay-on roller, said countercharging electrode very particularly being located over the transport means, preferably lay-on roller, in the region between the lay-on line of the composition coat and the take-off line of the coated substrate.

Accordingly, electrostatic discharges as a consequence of applying charges by the lay-on electrode can be prevented even before the coated substrate has departed the preferred lay-on roller, by countercharges of opposite polarity and appropriate size.

For fine tuning it is further advantageous to mount an active discharge means over the detachment line of the coated substrate from the preferred lay-on roller, in order to compensate process-related fluctuations over time and across the width of the web.

The countercharging electrode is preferably in the form of a wire electrode, blade electrode and/or needle electrode which is disposed transverse to the web.

Without adequate neutralization of the electrical charges applied to the web by the lay-on electrode(s), there may be a corona discharge between the lay-on roller and the underside of the substrate, which may adversely affect, in particular, anti-adhesive properties of the substrate.

Additionally, as a result of the corona discharge, charges of opposed polarity may be transported on the underside of the web as on the coating side. If such a web is subsequently neutralized with customary active or passive discharge means, the measurable electrical field is eliminated but afterward there are still very strong, equally high charges of opposed polarity on the two sides. If the electrical conductivity of the coats between the charges is low, there may be uncontrollable discharges in bales that have been wound up.

In order to subject the substrate to as little stress as possible, the substrate should then be placed onto the transport means, preferably lay-on roller, with a contact roller and/or removed from the transport means, preferably lay-on roller, with a take-off roller.

It is advantageous, additionally, to select a conductive elastic coating as the preferred roller with which the substrate is placed onto the preferably selected lay-on roller. Where a conductive coating cannot be used for technical reasons associated with the process, it is advantageous to subject the roller jacket to electrostatic discharge in a region in which it is not covered by the substrate. Otherwise, with each turn the roller surface may pick up more and more electrical charges, until uncontrolled discharge phenomena occur.

It is also advantageous to dispose a baffle of electrically insulating material in the running direction of the web upstream of the lay-on electrode, thereby limiting the ion-enriched area in the region of the lay-on electrode on the die side. It is favorable, in addition, to mount a grounded, electrically conducting metal plate on the side of the baffle that faces away from the lay-on electrode. By means of the baffle, any corona discharge upstream of the lay-on line can be reduced markedly by the composition coat on the substrate.

Also of advantage is an arrangement in which not only one needle electrode is used as lay-on electrode but instead two, directly following one another in the web direction, the two electrodes being offset laterally by half a needle spacing, thereby pairing the capacity of the needle electrodes for high charging currents with a relatively uniform charge distribution. In this context it has been found advantageous to impose a smaller high voltage on the front electrode than on the rear electrode.

In another preferred embodiment of the invention, the substrate is electrostatically neutralized prior to coating.

In order to rule out further the known disadvantages of the prior art, the electrical voltage of the transport means, preferably lay-on roller, can be from 1 to 40 kV, in particular from 2 to 15 kV.

In another preferred variant of the process of the invention, the composition on the substrate is crosslinked or polymerized before departing the transport means, preferably lay-on roller, in particular by means of electron beams, UV rays, visible light or a combination thereof and/or thermally.

The process can be used to outstanding effect in those applications where the substrate is a carrier or backing material for an adhesive tape and/or the composition is an adhesive.

In this case the composition used may also comprise acrylic, natural rubber, synthetic rubber or EVA adhesives.

The process can likewise be used to outstanding effect in those applications where the substrate is a release liner for an adhesive tape and the composition is an adhesive.

Furthermore, it is found that the tendency to form bubbles between the composition and the substrate increases if the substrate has become charged in an uncontrolled manner prior to placement onto the lay-on roller. It is also a problem if electrostatic discharge means are not mounted on the side of the web on which charging can take place as a result of separation events. In this case as well, no electrical field is measured any longer from the outside, but nevertheless there are equally strong electrical charges of opposed polarity on both sides of the web. The level of these double charges typically fluctuates in the web direction and also transversely to the web. These undefined double charges reduce the maximum speed at which the web can be effectively and safely run in a production process.

In one advantageous embodiment, discharge means are always mounted on the side at which charges occur as a result of separation events. With electrostatically difficult substrates, it may in extreme cases be of advantage to mount suitable discharge means behind each deflecting roller on the contact side and even in the winding nip at the unwind stage.

Moreover, it is advantageous to run the supplied bales with the substrate under electrostatic control as early as in the upstream process, or to select a sufficiently long interim storage period, due to sufficient electrical residual conductivities, for double charges to flow together. The time required may also be shortened by means of storage at elevated temperatures.

It is particularly advantageous to mount a baffle made of electrically insulating material in the running direction of the web between the applicator and the lay-on electrode, thereby bordering the ion-filled area in the region of the lay-on electrode by the applicator, especially die, the transport means, especially lay-on roller, and the baffle.

Unexpectedly for the skilled worker, the inventive process offers a solution to the problems posed. Thus, coating with a slot die onto a substrate at sufficiently high web speeds is made possible without the development of bubbles between the composition coat and the substrate, without adverse effects on other, quality-critical properties of the product to be produced, and without special risks to the operating staff.

Surprisingly it has been found that bubbles are formed between the composition coat and the substrate particularly when there is air between the substrate and the lay-on roller. If the substrate was placed onto the lay-on roller in a bubble-free manner, it was possible to carry out coating with a higher web speed without the formation of bubbles. The appearance of the coating is much more uniform than in the case of a coating operation in which the substrate was not placed bubble-free on the lay-on roller during the production process.

Moreover, it is possible to ascertain, unexpectedly, that the formation of bubbles between the composition coat and the substrate is greatly reduced if the substrate is electrostatically neutralized in the web region upstream of the lay-on roller, very preferably on the side at which a charge accumulation occurs as a result of charge separation events.

With further preference, the substrate present on the transport means can be crosslinked, between the lay-on electrode and discharge electrode, by means of high-energy radiation supplied by an irradiation means, specifically by means of electron beams (EB), UV or IR rays. This is especially advantageous when the substrate in question is an adhesive.

Typical exposure means employed in the context of the inventive embodiment of the process are linear cathode systems, scanner systems, or multiple longitudinal cathode systems, where electron beam accelerators are concerned.

The acceleration voltages are situated preferably in the range between 40 kV and 350 kV, in particular between 80 kV and 300 kV. The output doses range between 5 and 150 kGy, in particular from 15 to 90 kGy.

As UV crosslinking units it is possible in particular to employ one or more medium pressure mercury lamps each with an output of up to 240 W/cm per lamp. The doses set are preferably from 10 to 300 mJ/cm$^2$.

For crosslinking or polymerization with visible light, halogen lamps may be employed in particular.

As substrate it is also possible to use release liners with anti-adhesive coatings to which the adhesion of adhesives is low. The backing materials of release liners are typically composed of paper or plastics, such as PET, PP or else PE, for example. The plastics used generally have good electrical insulation properties and high electrical breakdown field strengths.

In the case of papers, in contrast, the electrical properties are determined substantially by the thin anti-adhesive coating, but also by the impregnation and the moisture content. When the composition is applied with assistance by electrostatic charging, greater importance attaches to the electrical properties of the applied composition. Although the compositions employed are usually electrical insulators, their residual conductivity at typical coating temperatures of 100° C. or more is often already sufficiently high for some of the applied charges to flow off through the composition and through the paper release liner into the lay-on roller before departing the roller. Since at the lay-on line, if the electrical conductivity is not too high, virtually all of the charge is still present on the composition coat, it is nevertheless possible to achieve sufficiently high pressing forces for bubble-free coating. In the subsequent electrical neutralization by the application of countercharges, however, it must be borne in mind that some of the charge has already flowed off. At low web speeds, the time available for the charges to flow off becomes greater, and proportionally more charge flows off before the detachment line is reached. The optimum level of the countercharges is therefore dependent on the web speed.

For reasons of both economics and processing, the release coatings used for release liners are as thin as possible. Use is also made of what have been dubbed "substituted-covering coatings". By this is meant that the carrier is not hidden 100% by the release coating. It has been found that neutralization of the coated substrate in the case of such release liners must be carried out with substantially greater precision than is the case, say, with PET or PP films with fully hiding silicone coatings of 1.5 g/m² or more.

In the cases of double-sided adhesive tapes, a distinction is made between the open side and the hidden side of the release liner. The hidden side of the release liner, after being unwound from the roll, is covered with the assembly comprising first adhesive film, carrier, and second adhesive film. For undisrupted further processing after coating and until application, the release forces from the adhesive on the open side should be less than or equal to, and at least not substantially greater than, release forces on the hidden side, since otherwise there may be a reorientation of the release liner to the other side.

Graded release liners are also available. With these, it can be insured that the hidden side has much higher release forces.

In the case of non-graded release liners, in particular, damage to the open side when producing a double-sided adhesive tape must only be relatively low, since the desire is to avoid replacement by an undamaged release liner.

For the production of double-sided adhesive tapes, the substrate may also be composed of the initial product from the first operation, namely of a release liner, an adhesive film, and the carrier.

As substrate or carrier material it is possible to use all known textile carriers such as wovens, knits, lays or nonwoven webs; the term "web" embraces at least textile sheetlike structures in accordance with EN 29092 (1988) and also stitchbonded nonwovens and similar systems.

It is likewise possible to use spacer fabrics, including wovens and knits, with lamination. Spacer fabrics of this kind are disclosed in EP 0 071 212 B1. Spacer fabrics are matlike layer structures comprising a cover layer of a fiber or filament fleece, an underlayer and individual retaining fibers or bundles of such fibers between these layers, said fibers being distributed over the area of the layer structure, being needled through the particle layer, and joining the cover layer and the underlayer to one another. As an additional though not mandatory feature, the retaining fibers in accordance with EP 0 071 212 B1 comprise inert mineral particles, such as sand, gravel or the like, for example.

The holding fibers needled through the particle layer hold the cover layer and the underlayer at a distance from one another and are joined to the cover layer and the underlayer.

Spacer wovens or spacer knits are described, inter alia, in two articles, namely an article from the journal kettenwirk-praxis 3/93, 1993, pages 59 to 63, "Raschelgewirkte Abstandsgewirke" [Raschel-knitted spacer knits] and an article from the journal kettenwirk-praxis 1/94, 1994, pages 73 to 76, "Raschelgewirkte Abstandsgewirke", the content of said articles being included here by reference and being part of this disclosure and invention.

Knitted fabrics are produced from one or more threads or thread systems by intermeshing (interlooping), in contrast to woven fabrics, which are produced by intersecting two thread systems (warp and weft threads), and nonwovens (bonded fiber fabrics), where a loose fiber web is consolidated by heat, needling or stitching or by means of water jets.

Knitted fabrics can be divided into weft knits, in which the threads run in transverse direction through the textile, and warp knits, where the threads run lengthwise through the textile. As a result of their mesh structure, knitted fabrics are fundamentally pliant, conforming textiles, since the meshes are able to stretch lengthways and widthways, and have a tendency to return to their original position. In high-grade material, they are very robust.

Suitable nonwovens include, in particular, consolidated staple fiber webs, but also filament webs, meltblown webs, and spunbonded webs, which generally require additional consolidation. Known consolidation methods for webs are mechanical, thermal, and chemical consolidation. Whereas with mechanical consolidations the fibers can be held together purely mechanically by entanglement of the individual fibers, by the interlooping of fiber bundles or by the stitching-in of additional threads, it is possible by thermal and by chemical techniques to obtain adhesive (with binder) or cohesive (binderless) fiber-fiber bonds. Given appropriate formulation and an appropriate process regime, these bonds may be restricted exclusively, or at least predominantly, to the fiber nodal points, so that a stable, three-dimensional network is formed while retaining the loose open structure in the web.

Webs which have proven particularly advantageous are those consolidated in particular by overstitching with separate threads or by interlooping.

Consolidated webs of this kind are produced, for example, on stitchbonding machines of the "Malifleece" type from the company Karl Meyer, formerly Malimo, and can be obtained, inter alia, from the companies Naue Fasertechnik and Techtex GmbH. A Malifleece is characterized in that a cross-laid web is consolidated by the formation of loops from fibers of the web.

The carrier used may also be a web of the Kunit or Multiknit type. A Kunit web is characterized in that it originates from the processing of a longitudinally oriented fiber web to form a sheetlike structure which has the heads and legs of loops on one side and, on the other, loop feet or pile fiber folds, but possesses neither threads nor prefabricated sheetlike structures. A web of this kind has been produced, inter alia, for many years, for example on stitchbonding machines of the "Kunitvlies" type from the company Karl Mayer. A further characterizing feature of this web is that, as a longitudinal-fiber web, it is able to absorb high tensile forces in the longitudinal direction. The characteristic feature of a Multiknit web relative to the Kunit is that the web is consolidated on both the top and bottom sides by virtue of the double-sided needle punching.

Finally, stitchbonded webs are also suitable as an intermediate forming an adhesive tape. A stitchbonded web is formed from a nonwoven material having a large number of stitches extending parallel to one another. These stitches are brought about by the incorporation, by stitching or knitting, of continuous textile threads. For this type of web, stitchbonding machines of the "Maliwatt" type from the company Karl Mayer, formerly Malimo, are known.

Also particularly advantageous is a staple fiber web which is mechanically preconsolidated in the first step or is a wet-laid web laid hydrodynamically, in which between 2% and 50% of the web fibers are fusible fibers, in particular between 5% and 40% of the fibers of the web.

A web of this kind is characterized in that the fibers are laid wet or, for example, a staple fiber web is preconsolidated by the formation of loops from fibers of the web or by needling, stitching or air-jet and/or water-jet treatment.

In a second step, thermofixing takes place, with the strength of the web being increased again by the (partial) melting of the fusible fibers.

The web carrier may also be consolidated without binders, by means for example of hot embossing with structured rollers, with properties such as strength, thickness, density, flexibility, and the like being controllable via the pressure, temperature, residence time, and embossing geometry.

For the use of nonwovens, the adhesive consolidation of mechanically preconsolidated or wet-laid webs is of particular interest, it being possible for said consolidation to take place by way of the addition of binder in solid, liquid, foamed or pastelike form. A great diversity of theoretical embodiments is possible: for example, solid binders as powders for trickling in; as a sheet or as a mesh, or in the form of binding fibers. Liquid binders may be applied as solutions in water or organic solvent or as a dispersion. For adhesive consolidation, binder dispersions are predominantly chosen: thermosets in the form of phenolic or melamine resin dispersions, elastomers as dispersions of natural or synthetic rubbers, or, usually, dispersions of thermoplastics such as acrylates, vinyl acetates, polyurethanes, styrene-butadiene systems, PVC, and the like, and also copolymers thereof. Normally, the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for effecting specific changes in the surface properties.

Such a procedure is not only sparing in its use of binder but also greatly reduces the energy requirement for drying. Since no squeeze rollers are required and the dispersion remains predominantly in the upper region of the web material, unwanted hardening and stiffening of the web can very largely be avoided.

For sufficient adhesive consolidation of the web carrier, the addition of binder in the order of magnitude of from 1% to 50%, in particular from 3% to 20%, based on the weight of fiber web, is generally required.

The binder may be added as early as during the manufacture of the web, in the course of mechanical preconsolidation, or else in a separate process step, which may be carried out in-line or off-line. Following the addition of the binder it is necessary temporarily to generate a condition in which the binder becomes adhesive and adhesively connects the fibers—this may be achieved during the drying, for example, of dispersions, or else by heating, with further possibilities for variation existing by way of areal or partial application of pressure. The binder may be activated in known drying tunnels, or else, given an appropriate selection of binder, by means of infrared radiation, UV radiation, ultrasound, high-frequency radiation or the like. For the subsequent end use it is sensible, although not absolutely necessary, for the binder to have lost its tack following the end of the web production process. It is advantageous that, as a result of the thermal treatment, volatile components such as fiber assistants are removed, giving a web having favorable fogging values so that when a low-fogging adhesive is used it is possible to produce an adhesive tape having particularly advantageous fogging values.

A further, special form of adhesive consolidation consists in activating the binder by incipient dissolution or swelling. In this case it is also possible in principle for the fibers themselves, or admixed special fibers, to take over the function of the binder. Since, however, such solvents are objectionable on environmental grounds, and/or are problematic in their handling, for the majority of polymeric fibers, this process is not often employed.

Starting materials envisaged for the textile carrier include, in particular, polyester, polypropylene, viscose or cotton fibers. The selection is, however, not restricted to said materials; rather it is possible to use a large number of other fibers to produce the web, this being evident to the skilled worker without any need for inventive activity.

Carrier materials used further include, in particular, laminates and nets, and also films (for example, a polyolefin from the group of the polyethylenes (for example, HDPE, LDPE, MDPE, LLDPE, VLLDPE, copolymers of ethylene with polar comonomers) and/or the group of the polypropylenes (for example, polypropylene homopolymers, random polypropylene copolymers or block polypropylene copolymers), monoaxially or biaxially oriented polypropylene, polyesters, PVC, PET, polystyrene, polyamide or polyimide), foams, foam material, of polyethylene and polyurethane, for example, foamed films, and creped and uncreped paper. Moreover, these materials may have been given a pretreatment and/or an aftertreatment. Common pretreatments are corona irradiation, impregnation, coating, painting, and hydrophobicization; customary aftertreatments are calendering, thermal conditioning, lamination, die cutting, and enveloping.

Low flammability in the carrier material and in the adhesive tape as a whole may be achieved by adding flame retardants to the carrier and/or to the adhesive. These retardants may be organobromine compounds, together where appropriate with synergists such as antimony trioxide; however, with a view to the absence of halogens from the adhesive tape, preference will be given to using red phosphorus, organophosphorus compounds, mineral compounds or intumescent compounds such as ammonium polyphosphate, alone or in conjunction with synergists.

As adhesives it is possible to use substantially all known adhesives possessing sufficient bond strength to the bond substrate that is to be packed.

The adhesive of the adhesive tape may be composed of an adhesive based on solventborne natural rubber adhesives and acrylic adhesives. Preference is given to adhesives based on acrylic dispersions; adhesives based on styrene-isoprene-styrene block copolymers are particularly preferred. These adhesive technologies are known and are used in the adhesive tape industry.

The coatweight of the adhesive on the carrier material is preferably from 15 to 60 g/m$^2$. In a further preferred embodiment, the coatweight set is from 20 to 30 g/m$^2$.

The adhesive tapes can be produced by known methods. An overview of customary production methods can be found, for example, in "Coating Equipment", Donatas Satas in Handbook of Pressure Sensitive Adhesive Technology, second edition, edited by Donatas Satas, Van Nostrand Reinhold New York pp. 767–808. The known methods of drying and slitting the adhesive tapes are likewise to be found in the Handbook of Pressure Sensitive Adhesive Technology, pp. 809–874.

A suitable adhesive composition is one based on acrylic hotmelt, having a K value of at least 20, in particular more than 30 (measured in each case in 1% strength by weight solution in toluene at 25° C.), obtainable by concentrating a solution of such a composition to give a system which can be processed as a hotmelt.

Concentrating may take place in appropriately equipped vessels or extruders; particularly in the case of accompanying devolatilization, a devolatilizing extruder is preferred. An adhesive of this kind is set out in DE 43 13 008 C2. In an intermediate step, the solvent is removed completely from the acrylate compositions prepared in this way.

The K value is determined in particular in analogy to DIN 53 726.

In addition, further volatile constituents are removed. After coating from the melt, these compositions contain only small fractions of volatile constituents. Accordingly, it is possible to adopt all of the monomers/formulations claimed in the above-cited patent. A further advantage of the compositions described in the patent is that they have a high K value and thus a high molecular weight. The skilled worker is aware that systems with higher molecular weights may be crosslinked more efficiently. Accordingly, there is a corresponding reduction in the fraction of volatile constituents.

The solution of the composition may contain from 5 to 80% by weight, in particular from 30 to 70% by weight, of solvent.

It is preferred to use commercially customary solvents, especially low-boiling hydrocarbons, ketones, alcohols and/or esters.

Preference is further given to using single-screw, twin-screw or multiscrew extruders having one or, in particular, two or more devolatilizing units.

The adhesive based on acrylic hotmelt may contain copolymerized benzoin derivatives, such as benzoin acrylate or benzoin methacrylate, for example, acrylates or methacrylates. Benzoin derivatives of this kind are described in EP 0 578 151 A.

The adhesive based on acrylic hotmelt may be UV-crosslinked. Other types of crosslinking, however, are also possible, an example being electron beam crosslinking.

In one particularly preferred embodiment, self-adhesive compositions used comprise copolymers of (meth)acrylic acid and esters thereof having from 1 to 25 carbon atoms, maleic, fumaric and/or itaconic acid and/or esters thereof, substituted (meth)acrylamides, maleic anhydride, and other vinyl compounds, such as vinyl esters, especially vinyl acetate, vinyl alcohols and/or vinyl ethers.

The residual solvent content should be below 1% by weight.

It is also possible to use an adhesive from the group of the natural rubbers or the synthetic rubbers or any desired blend of natural and/or synthetic rubbers, the natural rubber or rubbers being selectable in principle from all available grades such as, for example, crepe, RSS, ADS, TSR or CV grades, depending on required purity and viscosity, and the synthetic rubber or rubbers being selectable from the group of randomly copolymerized styrene-butadiene rubbers (SBR), butadiene rubbers (BR), synthetic polyisoprenes (IR), butyl rubbers (IIR), halogenated butyl rubbers (XIIR), acrylic rubbers (ACM), ethylene-vinyl acetate (EVA) copolymers and polyurethanes and/or blends thereof.

Furthermore, and preferably, the processing properties of the rubbers may be improved by adding to them thermoplastic elastomers with a weight fraction of from 10 to 50% by weight, based on the total elastomer fraction.

As representatives, mention may be made at this point, in particular, of the particularly compatible styrene-isoprene-styrene (SIS) and styrene-butadiene-styrene (SBS) types.

As tackifying resins it is possible without exception to use all known tackifier resins which have been described in the literature. Representatives that may be mentioned include the rosins, their disproportionated, hydrogenated, polymerized, esterified derivatives and salts, the aliphatic and aromatic hydrocarbon resins, terpene resins, and terpene-phenolic resins. Any desired combinations of these and other resins may be used in order to adjust the properties of the resulting adhesive in accordance with what is desired. Explicit reference is made to the depiction of the state of the art in the "Handbook of Pressure Sensitive Adhesive Technology" by Donatas Satas (van Nostrand, 1989).

"Hydrocarbon resin" is a collective term for thermoplastic polymers which are colorless to intense brown in color and have a molar mass of generally <2000.

They may be divided into three main groups according to their provenance: petroleum resins, coal tar resins, and terpene resins. The most important coal tar resins are the coumarone-indene resins. The hydrocarbon resins are obtained by polymerizing the unsaturated compounds that can be isolated from the raw materials.

Included among the hydrocarbon resins are also polymers obtainable by polymerizing monomers such as styrene and/or by means of polycondensation (certain formaldehyde resins), with a correspondingly low molar mass. Hydrocarbon resins are products with a softening range that varies within wide limits from <0° C. (hydrocarbon resins liquid at 20° C.) to >200° C. and with a density of from about 0.9 to 1.2 g/cm$^3$.

They are soluble in organic solvents such as ethers, esters, ketones, and chlorinated hydrocarbons, and are insoluble in alcohols and water.

By rosin is meant a natural resin which is recovered from the crude resin from conifers. Three types of rosin are differentiated: balsam resin, as a distillation residue of turpentine oil; root resin, as the extract from conifer root stocks; and tall resin, the distillation residue of tall oil. The most significant in terms of quantity is balsam resin.

Rosin is a brittle, transparent product with a color ranging from red to brown. It is insoluble in water but soluble in many organic solvents such as (chlorinated) aliphatic and aromatic hydrocarbons, esters, ethers, and ketones, and also in plant oils and mineral oils. The softening point of rosin is situated within the range from approximately 70 to 80° C.

Rosin is a mixture of about 90% resin acids and 10% neutral substances (fatty acid esters, terpene alcohols, and hydrocarbons). The principal rosin acids are unsaturated carboxylic acids of empirical formula $C_{20}H_{30}O_2$, abietic, neoabietic, levopimaric, pimaric, isopimaric, and palustric acid, as well as hydrogenated and dehydrogenated abietic acid. The proportions of these acids vary depending on the provenance of the rosin.

Plasticizers which can be used are all plasticizing substances known from adhesive tape technology. They include, inter alia, the paraffinic and naphthenic oils, (functionalized) oligomers such as oligobutadienes and oligoisoprenes, liquid nitrile rubbers, liquid terpene resins, animal and vegetable oils and fats, phthalates, and functionalized acrylates.

For the purpose of heat-induced chemical crosslinking, it is possible to use all known heat-activatable chemical crosslinkers such as accelerated sulfur or sulfur donor systems, isocyanate systems, reactive melamine resins, formaldehyde resins, and (optionally halogenated) phenol-formaldehyde resins and/or reactive phenolic resin or diisocyanate crosslinking systems with the corresponding activators, epoxidized polyester resins and acrylic resins, and combinations thereof.

The crosslinkers are preferably activated at temperatures above 50° C., in particular at temperatures from 100° C. to 160° C., with very particular preference at temperatures from 110° C. to 140° C.

The thermal excitation of the crosslinkers may also be effected by means of IR rays or high-energy alternating fields.

BRIEF DESCRIPTION OF THE DRAWINGS

With reference to the figures described below, one particularly advantageous embodiment of the invention is illustrated, without wishing to be unnecessarily restricted by the choice of the figures shown.

Figure 1:
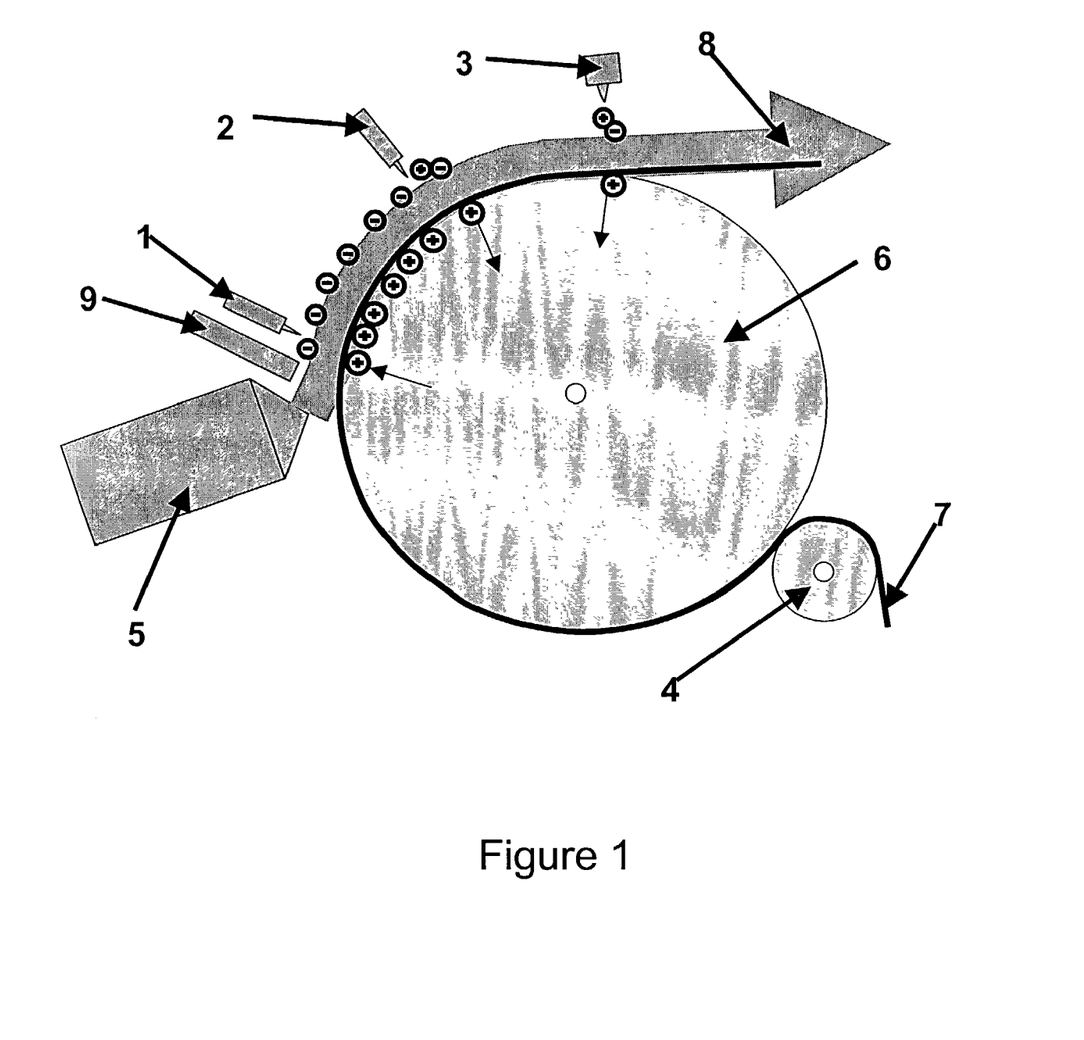
FIG. 1 shows the process of the invention in one particularly advantageous embodiment.

Accordingly, FIG. 1 shows a device in which an adhesive 8 is placed onto a substrate 7. That is, it shows a process for producing adhesive tapes.

The device has a lay-on roller 6; in this case, a grounded chill roll is used. The substrate 7 is a release liner, consisting of a monoaxially oriented polypropylene film provided on both sides with anti-adhesive silicone layers.

The substrate 7 is placed onto the lay-on roller 6 via a contact roller 4, thereby removing the air between substrate 7 and lay-on roller 6. Finally, via the coating die 5, the composition 8, in this case an adhesive, is applied, this operation being carried out under the lay-on electrode 1.

Here, with the lay-on electrode 1, electrons are applied to one side of the composition 8. Countercharges immediately develop on the surface of the lay-on roller 6. The resulting field causes a force to act on the composition plus substrate, this force pressing both layers onto the lay-on roller 6.

After it has traversed the countercharging electrode 2 and the discharge electrode 3, the substrate 7 coated with the composition 8 is removed from the lay-on roller 6.

The countercharging electrode 2 brings positive charges to the composition 8, the countercharges present so far on the surface flow off again, and the field largely collapses.

At the discharge electrode 3, finally, the last charges on the composition 8 are removed.

The baffle 9 upstream of the lay-on electrode 1 bounds the ion-enriched space.

Figure 2:
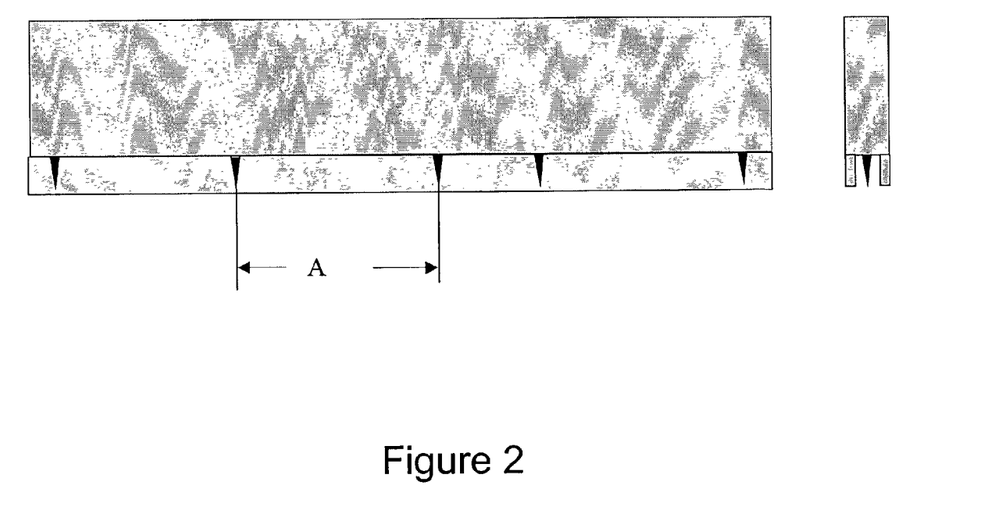
FIG. 2 shows an electrode arranl!ement according to the present invention.

FIG. 2 shows an electrode composed of a support on which a plurality of points are arranged in a row, said points in turn being arranged at regular intervals. The interval A shown is, in one preferred embodiment, 20 mm.

Figure 3:
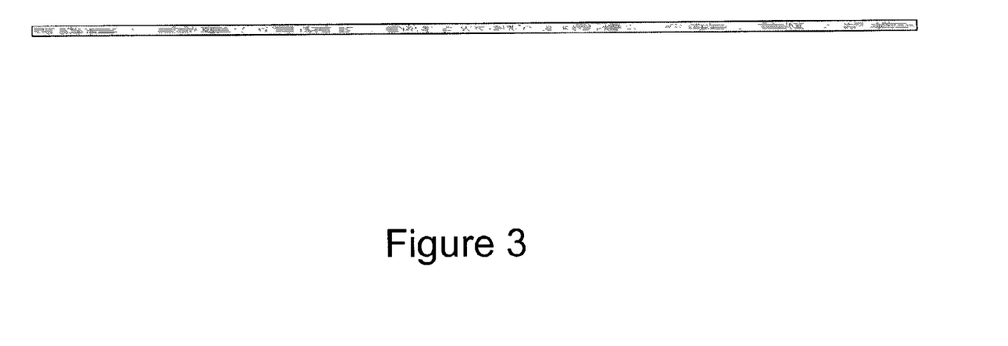
FIG. 3 shows another electrode arrangement according to the present invention.

FIG. 3 shows an electrode consisting simply of a wire stretched transversely over the die width.

Figure 4:
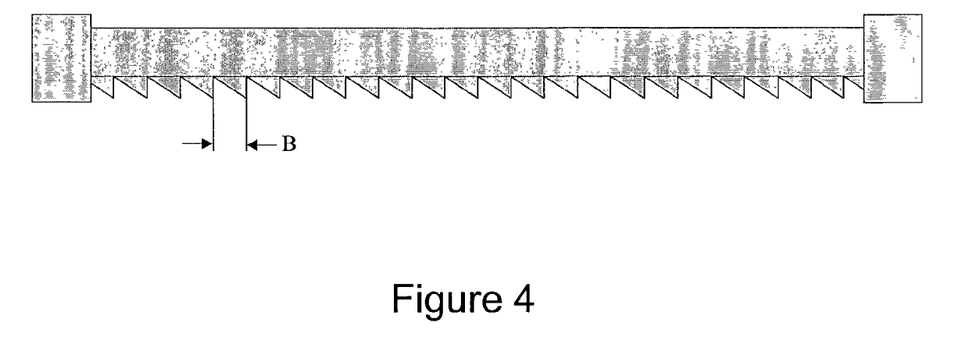
FIG. 4 shows a saw blade electrode arrangement according to the present invention.

FIG. 4 discloses what is known as a saw blade electrode. It is composed of a support with uniform teeth on one side. The teeth preferably have an interval B of 1 mm.

Figure 5:
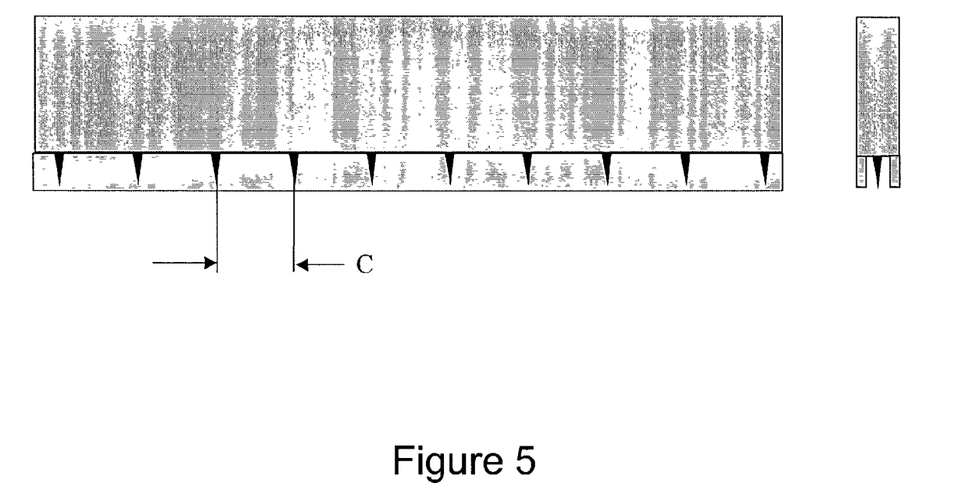
FIG. 5 shows an electrode with tips arranaement according to the present invention.

FIG. 5 likewise shows an electrode with tips, similar to that of FIG. 2, but with the interval C between the tips reduced to approximately 5 mm.

Figure 6:
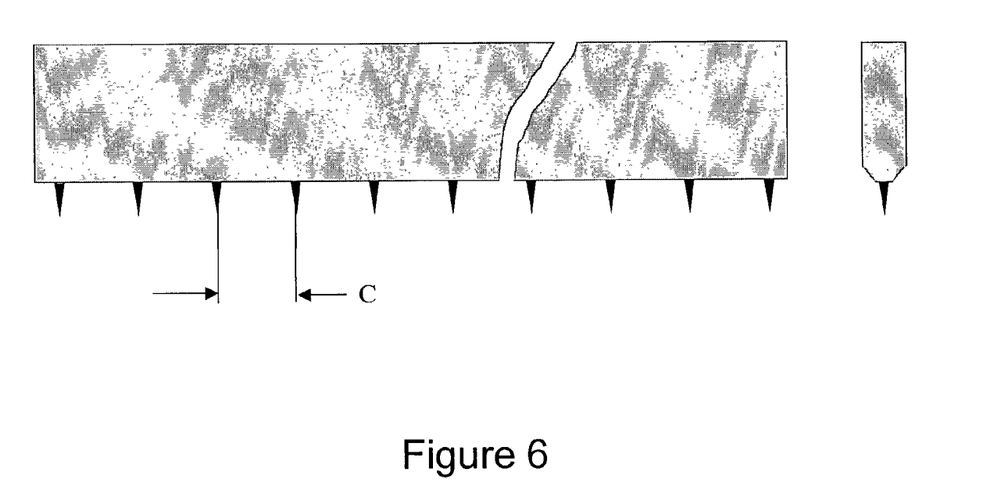
FIG. 6 shows a modified electrode with tips arrangement according to the oresent invention.

FIG. 6 represents a modification of the tipped electrode from FIG. 5: specifically, in this electrode, the contact protection which normally surrounds the electrodes has been removed.

Figure 7:
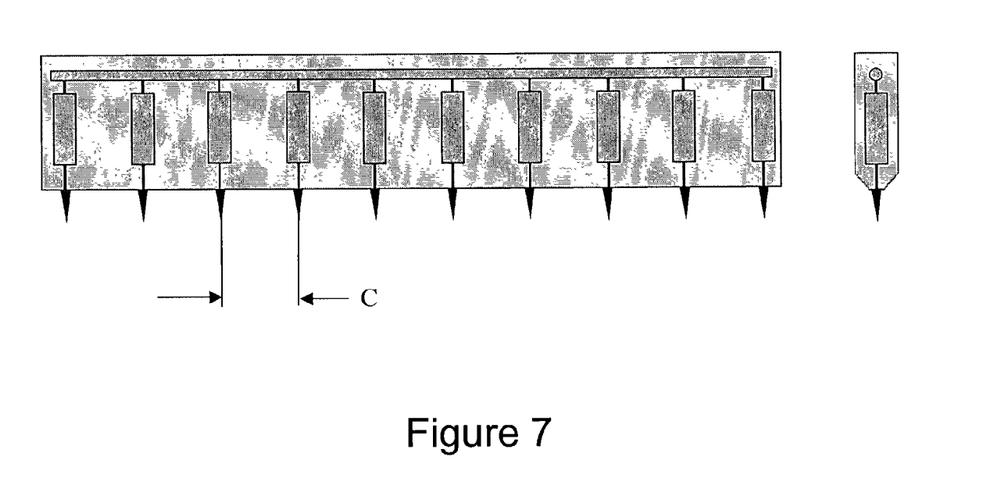
FIG. 7 shows the electrode from figure 6 in which the tips are driven via individual resistors.

FIG. 7 shows the electrode from FIG. 6 in which the tips are driven via individual resistors.

Figure 8:
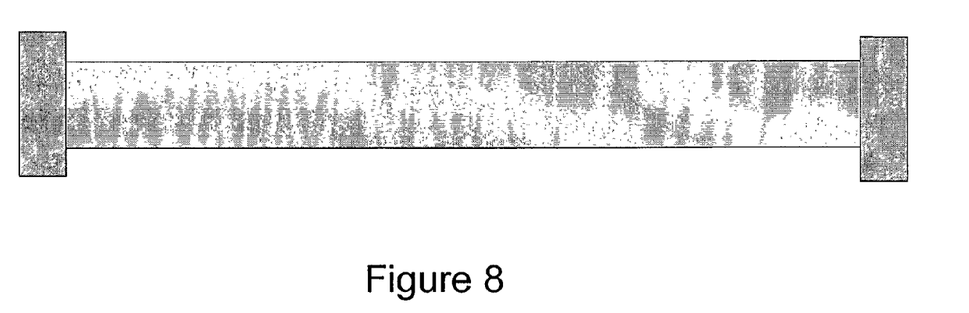
FIG. 8 shows a blade electrode arrangement according to the present invention.

FIG. 8, finally, discloses what is known is as a blade electrode, composed of an extremely thin support.

EXAMPLES

Example 1

An acrylic adhesive was polymerized in solvents and concentrated in an extruder. In a further extruder, resins, aging inhibitors, and other additives were admixed. Coating of the composition took place via a melt pump through a slot die (from Extrusion Dies Inc., USA) with a coating width of 35 cm onto a polypropylene release film, 70 µm thick, with which the coating was laid using a contact roller onto a temperature-controllable lay-on roller. In a downstream laminating station, a polyester film 12 µm thick was laminated onto the coated side of the first film, which had been provided on both sides with 0.5 g/m² anti-adhesive silicone layers. The laminate was then wound up.

The aim of the experiment was to raise the achievable coating speeds for an application rate of 85 g/m² without bubbles between composition and substrate, by means of various techniques for assisting the laying-on of the composition.

During the experiment, moreover, the anti-adhesive properties of the release film must not be substantially impaired.

The formation of bubbles was determined in line using a camcorder, a strong light source, and a monitor, with the aid of status pictures at exposure times of between 100 and 1000 microseconds, and also by the inspection of samples after the web had been halted.

Using an existing vacuum box (Extrusion Dies Inc., USA), which produced an underpressure between composition and substrate during the laying-on operation, a bubble-free web speed of only about 15 m/min could be achieved.

In the further course of the experiment, different electrodes were stretched over the lay-on line of the composition, transversely to the web direction. The electrodes used in each case (lay-on electrodes) were loaded with high voltages of between 8 and 28 kV in order to deposit electrical charges on the surface of the composition in the region of the lay-on point. This was done using a high-voltage generator from Eltex (model KNH34).

The following, substantially higher bubble-free web speeds were achievable with various forms of electrode as compared with the vacuum box:

| | |
|---|---|
| wire electrode (in-house construction) | 35 m/min |
| blade electrode (loan apparatus from Eltex) | 45 m/min |
| saw blade electrode (in-house construction with saw blade) | 65 m/min |
| needle electrode (type R130A from Eltex) | 75 m/min |

Depending on the electrode type, however, a number of unwanted secondary phenomena were observed. With the room darkened even just slightly, a corona discharge at the detachment line from the lay-on roller was visible between the roller and the release film during the coating operation.

Despite equipping the coating unit effectively with active and passive electrostatic discharge devices, discharge flashes occurred in some cases within wound-up bales.

Moreover, significant impairments to the anti-adhesive properties of the release film, especially on the side facing the roller, were found.

This was determined by the following measurement method.

Measurement of the Release Force

A double-sided test adhesive tape is applied without bubbles to that side of the release liner that is to be measured, and is pressed on by rolling over it five times with a 2 kg steel roller. The assembly is then stored in a hot chamber at 70° C. for one week. In order to measure the peel force (release force), the test tape side facing the release liner is fastened to a steel rail. The release liner bonded to the test adhesive tape is then peeled off at an angle of 180° and a speed of 300 mm/min. The tensile force (in cN/cm) required to achieve this is measured on a tensile testing machine under standardized conditions (23° C., 50% atmospheric humidity).

The values reported are the minimum, the maximum, and the average of five individual measurements.

Release Forces Measured by the Method Indicated

|  | Minimum | Maximum | Average |
| --- | --- | --- | --- |
| Undamaged reference sample | 7 cN/cm | 8 cN/cm | 7 cN/cm |
| Open side after coating | 39 cN/cm | 125 cN/cm | 58 cN/cm |
| Hidden side after coating | 19 cN/cm | 33 cN/cm | 25 cN/cm |

Example 2

The aim of this experiment was to eliminate the product damage and safety-relevant aspects such as discharge flashes in the wound-up bale that were mentioned in example 1.

In this experiment, the same setup as in example 1 was chosen. To charge the composition coat, however, the only lay-on electrode used was the needle electrode. Additionally, a second, identical needle electrode (countercharging electrode) was mounted in the region between the lay-on line of the composition and the take-off line of the coated substrate from the lay-on roller. The lay-on electrode was loaded with a negative high voltage of −15 kV for a web speed of 75 m/min. The distance of the needle tips from the roller surface, the position of the electrode in the running direction of the web, and the angle of inclination of the electrode to the tangent of the lay-on roller were optimized until bubbles were no longer observed between composition and substrate. At that point the needle distance was about 5 mm from the roller surface, the position of the electrode was about 8 mm behind the lay-on point in the running direction of the web, and the angle of inclination to the tangent of the lay-on roller was 90°.

The countercharging electrode was supplied with an opposed, i.e., positive, high voltage of +13.2 kV, so that the absolute value of the electrode current was equal to that of the lay-on electrode and the coated substrate was therefore electrostatically neutralized before departing the roller. The distance of the needle tips of the countercharging electrode from the roller surface was about 12 mm.

When the room was darkened during the coating operation, no corona discharge was observable at the detachment line from the lay-on roller between the roller and the release film.

With this regime, the existing equipment of the coating unit with active and passive electrostatic discharge devices was sufficient and there were no discharge flashes within wound-up bales. Additionally, it was safe to touch the bales.

The electrostatic charging of the coated substrate after departing the lay-on roller was determined by means of an electrical field meter (Eltex model: EM 02). For this purpose the electrical field meter was held at a distance of 5 cm above the web at a distance from the lay-on roller of about 30 cm in the running direction of the web. Thereafter the high voltage of the countercharging electrode was varied slightly until an electrical field around ±0 kV was indicated. The measured field, however, still fluctuated by about ±200 kV/m over time and also across the width of the web.

With the measurement method described above, only a slight impairment in the anti-adhesive properties was found on the hidden side of the release film. The side of the release film facing the lay-on roller showed a much lower increase in release force than in example 1. However, the individual measurements were subject to relatively severe fluctuations.

Release Forces Measured by the Method Indicated in Example 1

|  | Minimum | Maximum | Average |
| --- | --- | --- | --- |
| Undamaged reference sample | 7 cN/cm | 9 cN/cm | 8 cN/cm |
| Open side after coating | 20 cN/cm | 55 cN/cm | 35 cN/cm |
| Hidden side after coating | 15 cN/cm | 20 cN/cm | 18 cN/cm |

Example 3

The aim of this experiment was to reduce further the product damage reported in example 2.

In this experiment, the setup and conditions were the same as those chosen in example 2. Over the detachment line of the web from the lay-on roller, however, additionally an active discharge electrode (Eltex model: R51A) was fed with alternating current at 8 kV at a frequency of 50 Hz from a power supply (Eltex model: ES52).

With the measurement method described above no marked differences from example 2 were found on the hidden side of the release film. The release film side facing the lay-on roller showed on average a slight increase in the release forces relative to example 2, and the scatter of the individual measurements was less.

Release Forces Measured by the Method Indicated in Example 1

|  | Minimum | Maximum | Average |
| --- | --- | --- | --- |
| Undamaged reference sample | 7 cN/cm | 10 cN/cm | 9 cN/cm |
| Open side after coating | 18 cN/cm | 35 cN/cm | 28 cN/cm |
| Hidden side after coating | 14 cN/cm | 20 cN/cm | 17 cN/cm |

Example 4

The aim of this experiment was to reduce further the product damage reported in the above examples.

In this experiment the setup chosen was the same as in example 3. However, the composition coat was charged not just using one needle electrode as the lay-on electrode. In the running direction of the web, upstream of the lay-on electrode, a baffle of electrically insulating material was mounted, as a result of which the ion-filled space in the region of the lay-on electrode toward the die side was bounded up to the gap over the lay-on roller to the baffle.

Mounted on the side of the baffle facing away from the lay-on electrode was a grounded, electrically conducting metal plate.

With the baffle made of an electrical insulator material, an observed corona phenomenon upstream of the lay-on line was reduced by the composition coated onto the substrate.

With the arrangement it was possible to reduce further the damage corresponding to example 3, and a slight increase in the coating speed was also possible.

Release Forces Measured by the Method Indicated in Example 1

|  | Minimum | Maximum | Average |
|---|---|---|---|
| Undamaged reference sample | 7 cN/cm | 8 cN/cm | 7 cN/cm |
| Open side after coating | 17 cN/cm | 30 cN/cm | 24 cN/cm |
| Hidden side after coating | 12 cN/cm | 18 cN/cm | 15 cN/cm |

Example 5

The aim of this experiment was to reduce further the product damage reported in the above examples.

In this experiment the setup chosen was the same as in example 3. For the charging of the composition coat, however, the lay-on electrode system used comprise not just one needle electrode but instead two needle electrodes directly following one another in the web direction. In addition, the ribs on both sides of the row of needles, provided by the manufacturer as protection against injury, were removed and the electrodes were inclined toward one another in a V-shape, so that the distance between the rows of needles of the two electrodes was about 10 mm.

In the lateral direction, the electrodes were shifted relative to one another by 2.5 mm, so that in the case of the needle spacing of 5 mm provided by the manufacturer, from the web viewpoint, a distance of 2.5 mm was created.

With a web speed of 75 m/min, the front lay-on electrode was loaded with a negative high voltage of −11 kV and the rear lay-on electrode with −13.2 kV.

The countercharging electrode was supplied with an opposed, i.e., positive high voltage of +13.8 kV, so that the absolute value of the electrode current was equal to that of the lay-on electrode and the coated substrate was therefore electrostatically neutralized before departing the roller.

With the arrangement it was possible to reduce further the damage corresponding to example 3, and a slight increase in the coating speed was also possible.

Release Forces Measured by the Method Indicated in Example 1

|  | Minimum | Maximum | Average |
|---|---|---|---|
| Undamaged reference sample | 9 cN/cm | 11 cN/cm | 10 cN/cm |
| Open side after coating | 16 cN/cm | 30 cN/cm | 25 cN/cm |
| Hidden side after coating | 12 cN/cm | 19 cN/cm | 16 cN/cm |

Example 6

The aim of this experiment was to reduce further the product damage reported in the above examples.

In this experiment, the setup chosen was the same as in example 4.

Between unwind system and lay-on roller, a discharge bar was placed behind each deflecting roller on the roller side at a distance of 10 cm in the running direction of the web, behind the roller.

In the unwind system, an active discharge bar (Eltex type R51A) was placed in such a way that it pointed into the winding gap. This discharge bar was supplied by an 8 kV power supply (Eltex type ES52), while the other discharge bars (Eltex type R51A) behind the deflecting rollers were supplied by 5 kV power supplies (Eltex type ES51). Additionally, care was taken to ensure that the bales for unwinding had not already been charged by upstream processes.

Furthermore, the coating of the contact roller for the substrate onto the lay-on roller was replaced by an electrically conductive coating.

Release Forces Measured by the Method Indicated in Example 1

|  | Minimum | Maximum | Average |
|---|---|---|---|
| Undamaged reference sample | 7 cN/cm | 10 cN/cm | 9 cN/cm |
| Open side after coating | 14 cN/cm | 26 cN/cm | 22 cN/cm |
| Hidden side after coating | 11 cN/cm | 18 cN/cm | 14 cN/cm |

Example 7

The aim of this experiment was to prevent unallowable heating of the substrate and of the composition during a UV crosslinking procedure following the coating operation.

In order to produce an adhesive tape for cable bandaging, an open "Malifleece" from Karl Meyer was coated with an acrylic hotmelt composition from BASF on a lay-on roller. Application of the adhesive at a rate of 50 g/m$^2$ was carried out using a slot die, which was at a distance of about 10 mm from the lay-on roller and was temperature-controlled at 90° C. The lay-on roller had a diameter of 500 mm and a temperature of 40° C.

The adhesive laid itself on the nonwoven with hardly any inward seepage. Using a medium-pressure UV lamp with an electrical output of 160 W/cm from IST, mounted above the lay-on roller on the opposite side from the die, UV crosslinking was carried out with a web speed of 10 m/min. Following UV crosslinking, the adhesive tape was removed from the lay-on roller by way of an anti-adhesive contact roller and was then wound up. An important function of the take-off roller was to press the adhesive deeper into the open weave.

As a result of the severe heating, the nonwoven shrunk by about 8%. Moreover, as a result of the high temperature of the composition, it underwent transfer to the anti-adhesive contact roller.

In the further course of the experiment, in analogy to example 3, a lay-on electrode was mounted over the lay-on line of the composition to the substrate and a counterelectrode was mounted upstream of the UV lamp. An active discharge electrode was mounted downstream of the take-off roller, pointing into the gap between the roller and the composition side.

Charges applied by the lay-on electrode on the one hand press the substrate more firmly onto the lay-on roller, so that the transfer of heat to the roller was greatly improved, and secondly, advantageously, press the composition into the nonwoven, the extent of this effect being controllable by way of the high voltage applied to the lay-on electrode.

With electrostatic laying-on, the temperatures measured, in particular after the UV lamp and before the take-off roller, were much lower, as shown in the following table.

Web Temperatures Measured With and Without Electrostatic Charging

| Charging electrodes | absent | present |
|---|---|---|
| Temperature on die exit | 86° C. | 86° C. |
| Temperature 25 cm after die | 54° C. | 44° C. |
| Temperature before UV lamp | 50° C. | 42° C. |
| Temperature after lamp | 97° C. | 82° C. |
| Temperature before take-off roller | 78° C. | 46° C. |
| Temperature after take-off roller | 52° C. | 42° C. |

As a result of the lower heating, the nonwoven shrank by only 2%, and the transfer of composition to the anti-adhesive take-off roller was no longer observed. In addition, a roller configured as a contact roller was not really needed any more, since the inward pressing of the composition was brought about by the lay-on electrode alone.

What is claimed is:

1. A process for producing a product in web form comprising at least two layers, said process comprising applying a composition emerging from an applicator as a layer to a substrate in web form guided on a transporter, said applying taking place with an application of electrostatic charges, and electrostatically neutralizing the substrate coated with the composition before departing the transporter.

2. The process as claimed in claim 1, wherein said applicator is configured as a die.

3. The process as claimed in claim 1, wherein said transporter is configured as a lay-on roller.

4. The process as claimed in claim 1, wherein the composition is electrostatically charged by means of at least one charging electrode which is located above the transporter between the lay-on electrode and the discharge electrode.

5. The process as claimed in claim 1, wherein the application of electrostatic charges is effected by means of a lay-on electrode comprising two needle electrodes arranged directly following one another in the web direction, the needles being laterally offset by half the distance of a needle width.

6. The process as claimed in claim 1, wherein the substrate coated with the composition is electrostatically neutralized by means of at least one countercharging electrode before deposing the transporter, the countercharging electrode being located over the transporter in a region between the lay-on electrode and the discharge electrode.

7. The process as claimed in claim 1, wherein the substrate coated with the composition is kept electrostatically neutral by means of at least one discharge electrode on departing the transporter, the discharge electrode being located over the transporter in a region of a take-off line of the coated substrate.

8. The process as claimed in claim 1, wherein the substrate is placed with a contact roller onto the transporter and/or is removed from the transporter with a take-off roller.

9. The process as claimed in claim 1, wherein a baffle made of electrically insulating material is mounted in a running direction of a web between the applicator and a lay-on electrode.

10. The process as claimed in claim 1, wherein the substrate is electrostatically neutralized prior to coating.

11. The process as claimed in claim 1, wherein the electrical voltage of the transporter is from 1 to 40 kV.

12. The process as claimed in claim 1, wherein the composition on the substrate is crosslinked before departing the transporter.

13. The process as claimed in claim 1, wherein the substrate is a carrier material for an adhesive tape and/or the composition is an adhesive.

14. The process as claimed in claim 1, wherein the substrate is a release liner for an adhesive tape and/or the composition is an adhesive.

15. The process as claimed in claim 1, wherein the substrate is an initial product consisting of release liner, adhesive, and carrier for a double-sided adhesive tape and the composition is an adhesive.

16. The process as claimed in claim 1, wherein said composition comprises acrylic, natural rubber, synthetic rubber or EVA adhesives.

17. The process according to claim 2, wherein the die is a slot die.

18. The process according to claim 3, wherein the lay-on-roller is grounded and/or temperature-controllable.

19. The process according to claim 11, wherein the transporter is a lay-on-roller, and/or the electrical voltage of the transporter is from 2 to 15 KY.

20. The process according to claim 12, wherein the transporter is a lay on roller, and/or the composition on the substrate is crosslinked by one or more of electron beams, UV rays, visible light or heat.

* * * * *